Patented Aug. 14, 1945

2,382,085

UNITED STATES PATENT OFFICE 2,382,085

SYNTHESIS OF VITAMIN A

Nicholas A. Milas, Belmont, Mass., assignor to Research Corporation, New York, N. Y., a corporation of New York No Drawing. Application January 31, 1945, Serial No. 575,549

9 Claims. (Cl. 260—488)

This invention relates to a method for the synthesis of vitamin A. This application is a continuation-in-part of my application Serial No. 433,234, filed March 3, 1942.

In accordance with the invention a compound of the formula

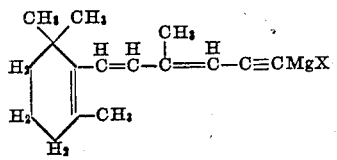

Compound I in which X stands for a halogen is caused to react with a compound of the formula

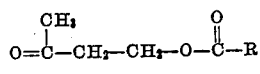

Compound II in which R is an alkyl or aryl group such as methyl, phenyl, palmityl, etc., to produce a compound of the formula

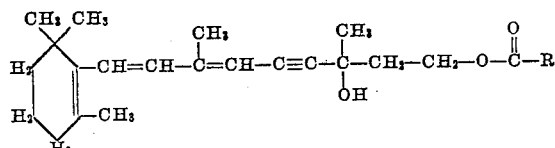

Compound III in which R has the same significance, reducing the acetylene linkage in the above compound to the ethylene linkage thereby producing a compound of the formula

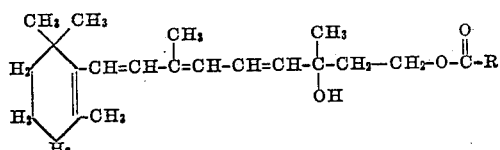

Compound IV in which R has the same significance, and dehydrating or dehydrohalogenating the above compound to the formation of a compound of the formula

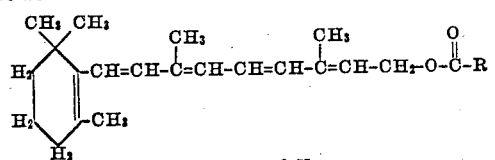

Compound V in which R has the same significance, this last compound being an ester of vitamin A which readily may be hydrolyzed to the free vitamin.

From the above outline, it will be seen that Compound III must be reduced and then dehydrated as illustrated, or dehydrated and then reduced to arrive at the product, Compound V. These two steps may be carried out in either order, i. e. reduction followed by dehydration as described, or dehydration followed by reduction. The alternative procedures are fully described with reference to the analogous compound having the formula

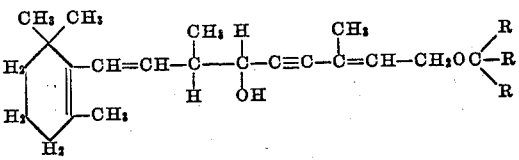

in my companion application Serial No. 573,313, filed Jan. 17, 1945, as a continuation-in-part of my application Serial No. 409,314, filed Sept. 2, 1941.

Moreover, the reduction of Compound III above to produce Compound IV or the reduction of the compound obtained by the dehydration of Compound III, to produce Compound V may be effected either by catalytic hydrogenation or by chemical reduction to yield predominantly the cis or trans isomer respectively as described in said continuation-in-part application.

The catalytic hydrogenation of Compound III shown above and described more fully hereinafter may be applied to the compound resulting from the dehydration of Compound III or the chemical reduction which consists essentially in treating the compound to be reduced with nascent hydrogen liberated by reaction of a metal or amalgam of a metal of the first or second group of the periodic system with alcohol, liquid ammonia or any substance which gives nascent hydrogen on reacting with the metal or by reaction of zinc, aluminum or their amalgams or certain alloys thereof with inorganic or organic bases or organic acids, may be applied to Compound III or to the compound formed by the dehydration of Compound III.

It is noted that when the reduction or hydrogenation is carried out in alcoholic alkali solution vitamin A will be produced directly instead of the acyloxy derivative of vitamin A.

The following detailed description of the steps of the process follows the above outline and does not include detailed descriptions of the alternative procedures referred to or detailed descriptions of the chemical reduction process applied to Compound III or its dehydration product because these procedures are fully described as applied to entirely analogous compounds in my companion application referred to above.

The preparation of Compound I above is described in my application Serial No. 433,226, filed March 3, 1942.

Compounds I and II are reacted to form Compound III as follows:

An ether solution of β-acetoxy ethyl methyl ketone (Compound II) is slowly added to an ether solution of an equimolecular amount of Compound I maintained at about 0° C. and the mixture is then refluxed for about 48 hours. It is then hydrolyzed by pouring into a mixture of cracked ice containing ammonium chloride. The product is extracted with ether, dried over anhydrous magnesium sulfate, the ether removed and the residue subjected to high vacuum distillation to remove any unreacted portions of Compounds I and II.

Compound III obtained as described above and being in this instance the acetoxy derivative, i. e. a compound of the formula given for Compound III above in which R is a methyl group, is partially hydrogenated by dissolving it in alcohol, and in the presence of palladium black, adding exactly one mole of gaseous hydrogen for each mole of Compound III under ordinary pressure. The hydrogenation can be carried out also by using catalytically active iron, instead of palladium, at a pressure of from 20 to 100 atmospheres.

Compound IV obtained as described above, being the acetoxy derivative, is converted to the acetate of vitamin A as follows:

About 10 grams is dissolved in toluene containing about 0.1 g. of anhydrous p-toluene sulfonic acid and the mixture heated, in an atmosphere of nitrogen under a slightly reduced pressure, to such a temperature that the toluene together with the water formed distill over. When the toluene comes over clear, the reaction is over and the mixture is dissolved in ether and the solution shaken with a saturated solution of sodium carbonate to remove the p-toluene sulfonic acid. The ethereal solution is finally dried over anhydrous magnesium sulfate, filtered and the ether removed under reduced pressure. The residue responds to all the tests of vitamin A.

Or Compound IV (acetoxy) may be converted into vitamin A directly as follows:

To a solution of 75 cc. of dry benzene add 9 g. of phosphorus trichloride and cool the mixture to 0° and, while nitrogen is passing through the solution, add slowly in the course of a half hour 75 cc. of dry benzene containing 11.22 g. of Compound IV (acetoxy). The mixture is then heated on the water bath to the boiling point of benzene for one hour, then the benzene and the excess phosphorus trichloride are removed under reduced pressure. The residue is then treated with 30 g. of potassium hydroxide in 300 cc. of alcohol, and the resulting mixture heated on the water bath to 70–80° under slightly reduced pressure for one hour. Finally, most of the alcohol is removed under reduced pressure and the residue diluted with water to three to four times its original volume and extracted with ether. The ethereal extract is dried over anhydrous magnesium sulfate, filtered and the ether removed under reduced pressure. The residual, highly viscous, yellowish-orange oil exhibit all the properties of vitamin A. The alcoholic potash not only removes two mols of hydrogen chloride but simultaneously saponifies the acetate group thereby producing vitamin A itself.

Better yields of vitamin A are obtained by using, in the above reaction, an equivalent quantity of pyridine together with Compound IV (acetoxy) in benzene and adding the mixture to the cold solution of benzene-phosphorus trichloride. It is also found advantageous to use phosphorus tribromide instead of phosphorus trichloride.

In all of the foregoing steps, the acetate has been used to exemplify the present process for the synthesis of vitamin A. However, the invention is not confined to this ester, since the benzoate, the propionate, the butyrate, the palmitate, or, in general, any acyloxy derivatives are equally operative.

I claim:

1. A compound of the formula

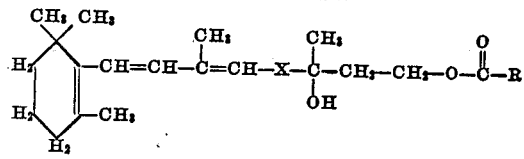

in which R stands for a member of the group consisting of alkyl and aryl groups and X is a member of the group consisting of acetylene and ethylene groups.

2. A compound as defined in claim 1 in which X is an acetylene group.

3. A compound as defined in claim 1 in which X is an ethylene group.

4. Process which comprises reacting a compound of the formula

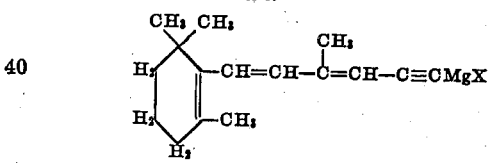

in which X stands for a halogen, with a compound of the formula

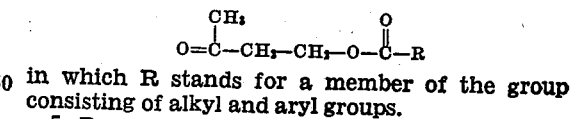

in which R stands for a member of the group consisting of alkyl and aryl groups.

5. Process as defined in claim 4 in which the product of reaction is hydrolyzed to the formation of a compound of the formula

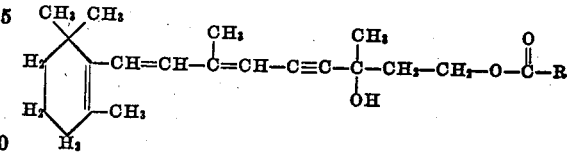

in which R is a member of the group consisting of alkyl and aryl groups, and catalytically hydrogenating the acetylene to an ethylene linkage.

6. Process as defined in claim 4 in which the product of reaction is hydrolyzed to the formation of a compound of the formula

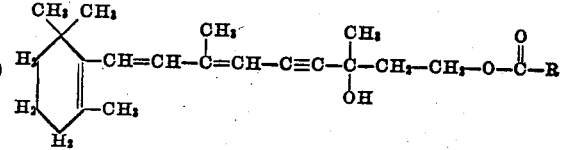

in which R is a member of the group consisting of alkyl and aryl groups, and chemically hydrogenating the acetylene to an ethylene linkage.

7. Process as defined in claim 4 in which the reaction product is hydrolyzed and the product of hydrolysis subjected to successive hydrogenation and dehydration.

8. Process as defined in claim 4 in which the reaction product is hydrolyzed and the product of hydrolysis subjected to dehydration followed by catalytic reduction of the acetylene linkage to the ethylene linkage.

9. Process as defined in claim 4 in which the reaction product is hydrolyzed and the product of hydrolysis is subjected to dehydration followed by chemical reduction of the acetylene linkage to the ethylene linkage.

NICHOLAS A. MILAS.